United States Patent [19]

Koh et al.

[11] Patent Number: 4,949,383
[45] Date of Patent: Aug. 14, 1990

[54] FREQUENCY DOMAIN SPEECH CODING

[75] Inventors: Soo N. Koh, Telok Blangah Hts, Singapore; Costas Xydeas, Loughborough, United Kingdom

[73] Assignee: Bristish Telecommunications public limited company, Great Britain

[21] Appl. No.: 396,771

[22] Filed: Aug. 21, 1988

Related U.S. Application Data

[63] Continuation of Ser. No. 768,786, Aug. 23, 1985, abandoned.

[30] Foreign Application Priority Data

Aug. 24, 1984 [GB] United Kingdom ................. 8421498

[51] Int. Cl.$^5$ ............................................. G10L 5/00
[52] U.S. Cl. ............................................. 381/31
[58] Field of Search ................................. 381/29–32, 381/36–41; 364/513.5; 370/118; 375/122, 25–26

[56] References Cited

U.S. PATENT DOCUMENTS

| | | | |
|---|---|---|---|
| 4,142,071 | 2/1979 | Croisier et al. | 381/29 |
| 4,184,049 | 1/1980 | Crochiere et al. | 381/31 |
| 4,216,354 | 8/1980 | Esteban et al. | 381/31 |
| 4,516,258 | 5/1985 | Ching et al. | 381/31 |
| 4,535,472 | 8/1985 | Tomcik | 381/31 |
| 4,538,234 | 8/1985 | Honda et al. | 364/513.5 |
| 4,589,130 | 5/1986 | Galand | 381/31 |
| 4,713,776 | 12/1987 | Araseki | 381/31 |

FOREIGN PATENT DOCUMENTS

| | | |
|---|---|---|
| 1206280 | 6/1986 | Canada . |
| 0145332 | 6/1985 | European Pat. Off. . |
| 3102822 | 8/1982 | Fed. Rep. of Germany . |

OTHER PUBLICATIONS

Ramstad, "Sub-Band Coder with a Simple Adaptive Bit-Allocation ALgorithm", IEEE ICASSP 82, pp. 203–207.
Crochiere—"On the Design of Sub-Band Coders for Low-Bit-Rate Speech Communication", Bell System Technical Journal, vol. 56, pp. 747–779 (may–Jun. 1977).
IEEE Transaction on Acoustics, Speech and Signal Processing, vol. ASSP-27 No. 5, Oct. 1979, pp. 512–530, IEEE, New York, U.S.; J. M. Tribolet et al.; "Frequency Domain Coding of Speech".
Zelinski et al., "Adaptive Transform Coding of Speech Signals", IEEE Transactions on Acoustics, Speech, and Signal Processing, vol. ASSP-25, No. 4, Aug. 1977, pp. 299–309.
Crochiere et al., "Digital Coding of Speech in Sub--Bands", Bell System Technical Journal, vol. 55, No. 8, Oct. 1976, pp. 1069–1085.

*Primary Examiner*—Gary V. Harkcom
*Assistant Examiner*—John A. Merecki
*Attorney, Agent, or Firm*—Nixon & Vanderhye

[57] ABSTRACT

Adaptive bit allocation to the channels of a sub-band coder (or to the coefficients of a transform coder) by using a fixed set of numbers of bits, only the selection of those channels to which the available bits are assigned being varied.

14 Claims, 2 Drawing Sheets

FREQUENCY DOMAIN SPEECH CODING

This is a continuation of application Ser. No. 06/768,786, filed 23 Aug. 1985, now abandoned.

FIELD OF THE INVENTION

This invention concerns frequency domain speech coding, such as sub-band coding in which the frequency spectrum of an input signal is separated into two or more sub-bands which are then coded individually, or transform coding in which a block of input samples are converted to a set of transform coefficients.

This application is related to commonly assigned copending U.S. application No. 672,232, U.S. Pat. No. 4,703,480, of Westall et al, filed 16 Nov. 1984.

BACKGROUND AND SUMMAARY OF THE INVENTION

Sub-band coding has been shown to be an effective method of reducing the bit-rate required for the transmission of signals - see, for example Crochiere, Webber and Flanagan "Digital Coding of Speech in Sub-bands", Bell System Technical Journal, Vol. 55 pp. 1069–1085 (Oct. 1976) and Crochiere, "On the Design of Sub-band Coders for Low Bit-Rate Speech Communications, ibid Vol. 56, pp 747–779 (May-Jun. 1977).

The technique involves splitting the broadband signal into two or more frequency bands and encoding each band separately. Each band can then be down-sampled, and coding efficiency improved by using different coding strategies, which can be optimized to the statistics of the signal. This is especially advantageous for speech transmission because the coders can exploit certain perceptual effects connected with hearing. In particular, provided that appropriate quantizers are used, the technique will result in the quantization noise at the output of the codec having a similar power spectral distribution to that of the uncoded signal; it is well-known that the human ear is relatively tolerant to noise in the parts of the spectrum occupied by high level wanted signals. Additionally, the higher frequency components can be represented with reduced accuracy because the ear is less sensitive to their absolute content. Although benefits can be obtained using a fixed coding scheme, an adaptive scheme which takes account of the changing properties of the signal with time, is preferred. AFter transmission, the individual sub-bands are up-sampled and passed through interpolation filters prior to recobination.

In transform coding, a block of (say) 128 input samples is subjected to a suitable transformation such as the discrete cosine transform to produce a set of 128 coefficients; again efficiency can be improved by adaptive coding.

When adaptive bit allocation is used, the coding characteristics of the system are matched to the short-term spectrum of the input signal. One such proposal (J. M. Tribolet and R. E. Crochiere, "Frequency Domain Coding of Speech" IEEE Trans. on ASSP, Vol. ASSP-27, No. 5, Oct. 1979) utilizes a fully adaptive assignment of bits to each sub-band signal. The algorithm proposed is:

$$R_i = \bar{R} + \frac{1}{2} \log_2 \frac{\sigma_i^{2(1+\gamma)}}{\left| \prod_{j=1}^{N} \sigma_j^{2(1+\gamma)} \right|^{1/N}} \quad (1)$$

where $\bar{R}$ is the total number of bits available divided by the number of sub-bands N in the system, $\sigma_i^2$ is the energy of the ith sub-band signal within the time interval under consideration, $R_i$ is the number of bits allocated to the ith sub-band and $\gamma$ may be varied for noise shaping.

The problem with the bit allocation strategy of equation (1) is that the value of $R_i$ is usually fractional and often negative. The process of (i) rounding $R_i$ to an integer value, (ii) restricting the maximum value of $R_i$ to (typically) 5 and (iii) setting negative values of $R_i$ to 0, may result in the total number of bits allocated exceeding or falling below the number of bits available. In this case readjustments have to be made by reapplying equation (1) or by an arbitrary process of adding or subtracting bits to or from the bands. Moreover, the amount of computation involved is substantial.

According to the present invention there is provided a coder for speech signals comprising separation means for receiving speech signals and generating series of value, each series representing respective portions of the frequency spectrum of the input signal, encoding means for digitally encoding each series, and bit allocation means for varying the number of bits used for encoding the respective series in dependence on the relative energy contents thereof, characterised in that the number of series to which any given number of bits is allocated is constant, only the selector of the series to which respective numbers of bits are allocated being varied.

In another aspect the invention provides a method of coding a speech signal in which the signal is divided into separate channels representing respective portions of the frequency spectrum of the input signal, and the channels are each encoded using a variable number of bits dependent upon the relative energy contents of the channels, characterized in that the number of channels to each of which any given number of bits is allocated is constant, only the selection of the channels to which respective number of bits are allocated being varied.

The series or channels referred to may be the channels of a sub-band coder or the transform coefficients of a transform coder.

Where a scaling factor is applied to the signals, preferably the bit allocation is performed as a function of the scaling factor, so that decoding can be carried out by reference to the scale factors, avoiding the necessity for tranmission of additional side information.

BRIEF DESCRIPTION OF THE DRAWINGS

An embodiment of the invention will now be described, by way of example, with reference to the accompanying drawings, in which.

DETAILED DESCRIPTION

Figure 1:
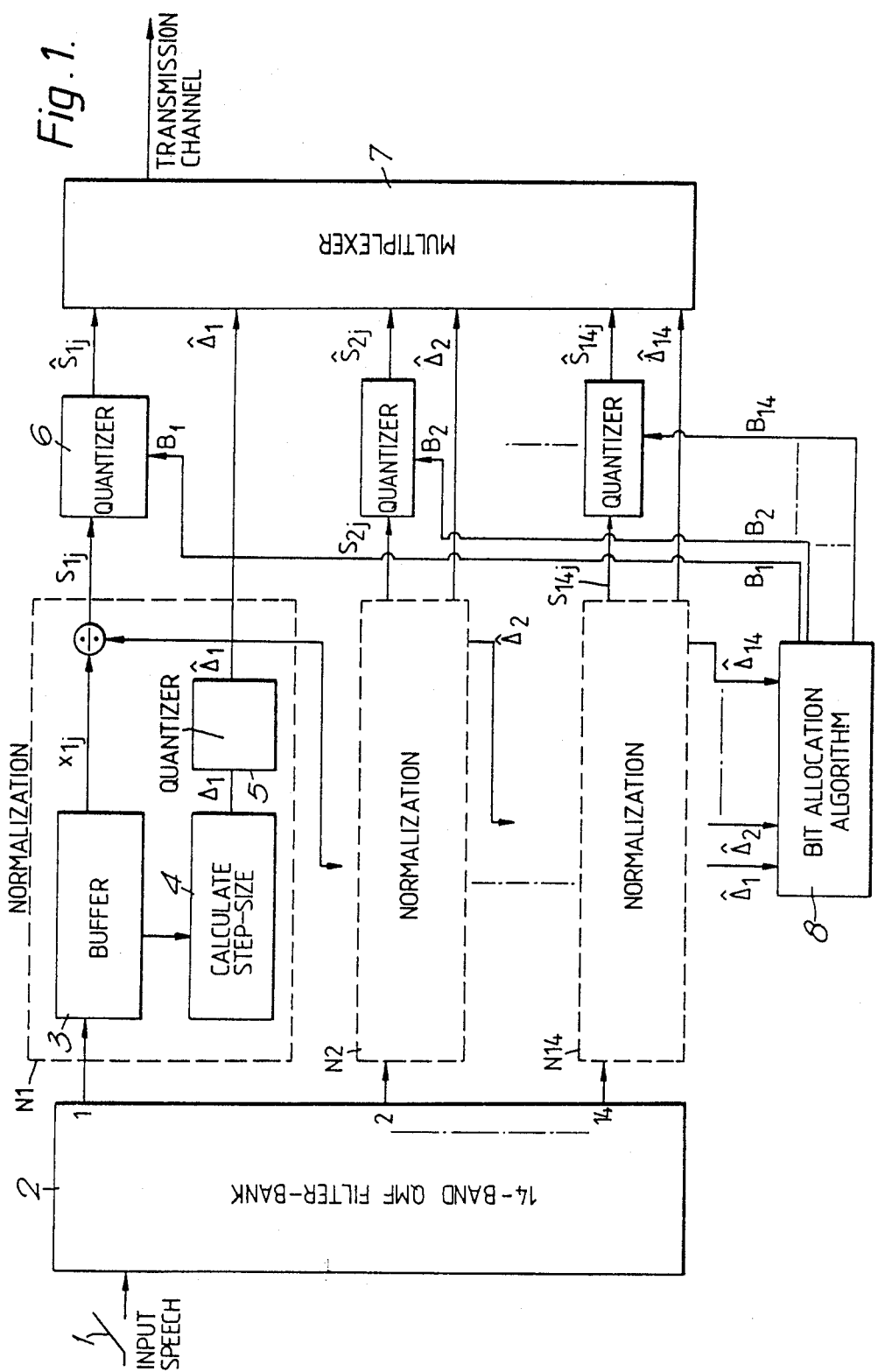
FIG. 1 is a block diagram of a sub-band coder according to invention.

FIG. 1 shows a 14 band 32 kbit/s sub-band coder system. The input signal having a nominal bandwidth of 7 kHz is sampled at 14 kHz—illustrated schematically by a switch 1—and the full band spectrum is divided into fourteen uniform bands by a four-stage tree-structured filter bark 2 employing quadrature mirror filters. 32-tap finite impulse response filters are suggested though lower order filters could be employed at the higher stages of the filter bank. The filter outputs are, as is conventional, down sampled (by means not shown) to 1 kHz.

Laplacian forward adaptive quantizers are employed for the quantization of the sub-band signals. Essentially there are two stages here; firstly (normalization stages N1 ... N14) the signal is normalized by dividing by a scaling factor which is defined every 16 ms from estimates of the energy of the relevant sub-band. Basically this is the rms value of the signal over that period. 16 samples (for sub-band 1, $x_{1j}$—j=1, ... 16) are buffered in a register 3, and the scaling factor or step size $\Delta_1$ calculated at 4 using the relation $$\Delta_k = \sum_{j=1}^{16} 16\, x_{kj}^2/16.$$

The scaling factors are quantized to 5-bit accuracy in a quantizer 5 and the quantized value $\hat{\Delta}$ transmitted as side information to the receiver. Thus the side information accounts for almost 4.5 kbit/s and thus approximately 27.5 kbit/s is available for transmission of the samples themselves. These processes are carried out for each of the fourteen sub-bands. The normalized samples ($S_{kj}=x_{kj}/\hat{\Delta}_k$) for each sub-band are then fed to a quantizer 6 which encodes them using the desired number of bits $B_K$ prior to transmission via multiplexer 7. Bit allocation is indicated in FIG. 1 schematically as unit 8.

In the prior proposal of Tribolet and Crochiere, equation (1) was used to define the bit allocation, In the present proposal, equation (1) is used to determine the bit allocation patterns for all the 16 msec frames in an input training sequence which is free of any silent intervals. $\gamma$ is set to $-0.3$ and the maximum number of bits M allowed in the allocation is set to 5. Let $N_i$ represent the total number of times in the training sequence that i bits are allocated, where i=1 ... ,5.

Next, we define $f_i$ as:

$$f_i = \frac{N_i i}{N_T}, i = 1, \ldots, M \qquad (2)$$

where $N_T$ is the total number of bits available for allocation throughout the training sequence. $f_i$ therefore represents the portion of $N_T$ used in allocating i bits for the coding of sub-band signals. If there are $N_t$ bits available for allocation the expected number of bands $n_i$ that receive i bits can be calculated according to:

$$n_i = \text{nearest integer of } (f_i N_t)/i \qquad (3)$$

for i=1, ... , M. A time-invariant bit allocation pattern is thus obtained using the $n_i$ estimates, i.e., ($n_5$ * 5 bits, $n_4$ *4 bits, ... ,$n_1$ * 1 bit; 0 bit for the remaining bands), assuming M is equal to five. This means that, within a 16 msec frame, $n_5$ sub-bands receive 5 bits, $n_4$ sub-bands receive 4 bits and so on. Manual adjustment is normally required to ensure that the total number of bits in the invariant allocation pattern gives the desired total transmission bit rate. For the 14-band coder, the 27.5 kbit/sec capcity and 1 kHz sampling rate permit 27 bits, and the bit pattern obtained was given by:

(1*5, 1*4, 3*3, 2*2, 5*1, 2*0)

Though the pattern is fixed, the allocation is based on the scale factors of the sub-band signals. For each frame of 16 msec the bank with the largest scaling factor is allocated 5 bits; the 2nd largest 4 bits and so on. The processing requirements of this algorithm are considerably reduced when compared with those of the fully adaptive scheme, since once the invariant allocation pattern has been derived, it is fixed for a given coder. Also because the allocation of these bit groups to the particular sub-bands is determined by reference to the scaling factors, the transmission of further side information to the receiver is not necessary.

Considering now transform coding, in this example an adaptive transform coder using the discrete cosine transform employs a blocksize of 128 samples. An estimation of the 16 primary coefficients of the basic spectrum (R Zelinski and P Noll, "Adaptive transform coding of speech signals", IEEE Trans. on ASSP, Vol ASSP-25, No. 4, pp 299-309, Aug. 1977) is carried out every 8 msec although the average of two set sof these coefficients, from adjacent frames, is used to define the step-sizes of the transofrm coefficient qauantizers and the bit allocation pattern. 3 bit Gaussian quantizers are used to quantize the 16 primary values of the average basis spectrum. Normalization of the input samples is also carried out using a normalization parameter which is evaluated every 256 samples. The normalization parameter is quantized using a 5 bit Gaussian quantizer.

The problem of efficiently coding the resulting 128 coefficients is similar to that of coding the sub-band samples in the previous examples. Here equations 1 to 3 are applied to a training sequence to obtain a bit allocation pattern ($\gamma=-0.2$) of:

(1*7, 4*6, 5*5, 9*4, 20*3, 25*2, 28*1, 36*0), that is, out of the 128 transform coefficnets, 1 coefficient is quantized with 7 bits 4 coefficients with 6 bits etc.

The advent of digital signal processing (DSP) devices has facilitated the real-time implementation of a number of otherwise difficult to implement speech coding algorithms. A sub-band coder for example, can be conveniently implemented using a DSP chip. The implementation complexity of a coder depends to an extent on the number of multiplications/divisions, additions/substractions and on the size of memory required for storing the intermediate variables of the coding algorithm. Table 1 illustrates the computational requirements, including delays, of the coders considered. SBC and ATC indicate sub-band and transform coding respectively, whilst ABA indicates adaptive bit allocation according to equation (1) and SBA the simplified bit allocation as described above.

|  | Memory size (words) | No. of ×/÷ (/sample) | No of +/− (/sample) | System delay (m sec) |
| --- | --- | --- | --- | --- |
| ADPCM | 50 | 37 | 38 | ≈ 0 |
| SBC/SBA (can be reduced to) | 700 500 | 62 45 | 65 48 | 45 33 |
| ATC/ABA | 900 | 9 | 14 | 25 |

TABLE 1 Summary of the system complexity for the various decoders.

A fast algorithm for the cosine transform was assumed in deriving the above estimates. Note that the adaptive transform coders also require additional $\log_2$ and inverse $\log_2$ look-up Tables. For the sub-band coder, the higher stages of the quadrature mirror filter analysis bank can be implemented using lower order FIR filters to reduce the memory size and coder delay. Excluded in the estimation is the memory required for the program instructions of the coding algorithm. Currently, due to their stringent real-time and memory requirements, large blocksize transform coders can be more conveniently implemented using array processors.

The performance of the coders described has been assessed by computer simulation in terms of
(1) average segmental signal-to-noise ratio
(2) long-term average spectral density plot of the output noise and
(3) informal subjective listening tests.

The input data used in our computer simulation experiments consisted of two sentences of male speech and two sentences of female speech. Table 2 shows the average segmental SNR performance (in dBs) of the coders.

| Coder | Male (average of 2 sentences) | Female (average of 2 sentences) | Total average |
|---|---|---|---|
| SBC/ABA | 19.26 | 20.52 | 19.88 |
| SBC/SBA | 18.79 | 19.68 | 19.24 |
| ATC/ABA | 14.60 | 12.58 | 13.59 |
| ATC/SBA | 13.73 | 11.50 | 12.62 |
| ADPCM | 13.55 | 18.02 | 15.79 |

TABLE 2. Average segmental SNR measurements of the various coders.

The two sub-band coding schemes offer the best SNR measurements of 19.88 and 19.24 dB. Informal subjective listening tests indicate that the SBC/ABA system produces an excellent quality recovered speech. This is due to the fact that the output noise level is low enough and is masked by the speech energy in each band. Also, the use of the simplified bit allocation algorithm did not affect the subjective quality of the 14-band coder though there is a drop of 0.6 dB in SNR.

The next scheme, in order to merit, is adaptive transform coding employing the full algorithm. The distortion due to inter-block discontinuities can be substantially reduced by smoothing. It should be noted that subjectively the difference between sub-band and transform coding is not as significant as suggested by their large difference in SNR values. The transform coder employing the simplified bit allocation algorithm was found to have an SNR reduction of 1 dB compared to the one with the fully adaptive algorithm. The block-end distortion becomes more pronounced and the recovered speech is also degraded by a "whispery" noise. This means that as the noise level, at this bit rate, is just at the threshold of audibility, the use of the full adaptation algorithm becomes necessary. However, if more bits are allowed for the transform coder, the SBA algorithm might prove to be a valuable method in reducing the coder complexity.

In general, some degradation in the quality of the ATC speech at 32 kbits/sec is caused by interblock discontinuities. Though the underlying speech can be very good, the effect of discontinuities is perceptually unaccpetable. One suggested solution to this problem is to apply 10 percent overlap between adjacent blocks. Another method is to employ either median filtering or a moving average filtering process to a few samples at both ends of each block. The 10 percent overlap scheme is found to be the least effective because fewer bits are available for the quantization of the transform coefficients which in turn increases the amount of block-end distortion. The method of median filtering is found to give some subjective improvement while the best performance is obtained from the moving averaging method. In its use, 10 samples $x_1, x_2, \ldots, x_{10}$ (the last five samples of the previous block and the first five samples of the present block) were replaced by $y_1, y_2, \ldots, y_{10}$, where $y_i = \frac{1}{3}(x_{i-1} + x_i + x_{i-1})$, and $i = 1, \ldots, 10$.

Figure 2:
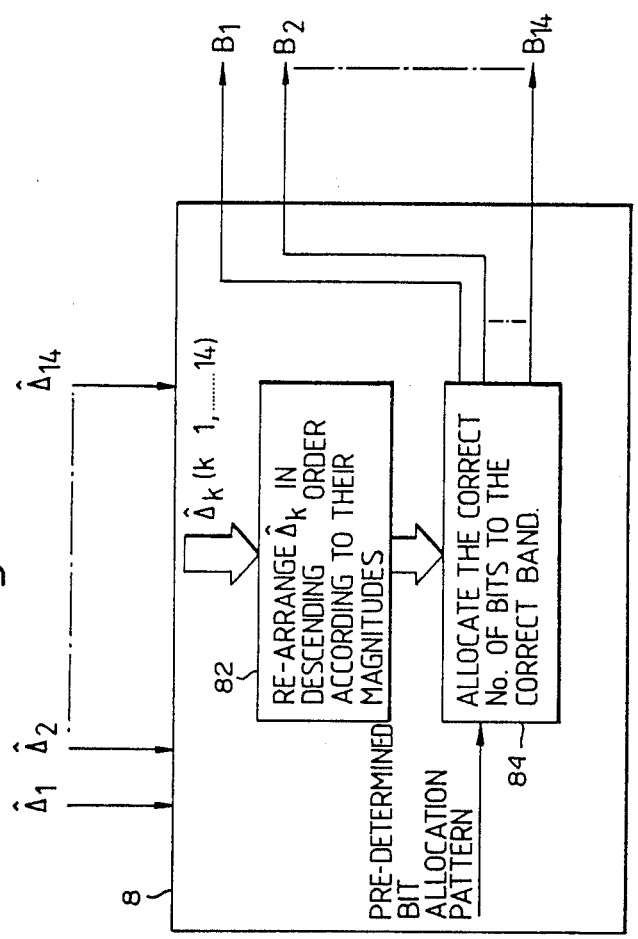
FIG. 2 illustrates the bit allocation process of the apparatus of FIG. 1.

An exemplary method used for implementing the bit allocation algorithm 8 is depicted at FIG. 2. Here, the quantized normalization factors $\Delta_1$ through $\Delta_{14}$ used for each 16 ms data block or "frame" are supplied as inputs to block 82 where they are re-arranged into descending order according to their magnitudes. This reordered sequence (e.g., $\hat{\Delta}_5, \hat{\Delta}_2, \hat{\Delta}_1, \ldots$) is then used at block 84 in conjunction with the previously derived magnitude ordered bit allocation pattern form the 14 sub-bands (e.g., 1*5, 1*4, 3*3, 2*2, 5*1, 2*0) to correspondingly allocate the correct number of bits to the correct band (e.g., 5 bits for the 5th sub-band, 4 bits for the 2nd sub-band, 3 bits for the 1st sub-band, ...). The resulting allocated numbers of bits are then output at $B_1 \ldots B_{14}$ to control the appropriate quantizers 6 for that particular 16 ms time block (e.g., 27 bits) as depicted in FIG. 1.

We claim:
1. A sub-band coder for speech signals comprising:
   filter means for dividing the frequency spectrum of speech signals input thereto into a plurality n of sub-bands and generating for each sub-band a respective series of samples corresponding to that sub-band;
   encoding means for digitally encoding each series, and
   bit allocation means for varying the number of bits used for encoding each respective series in dependence on the relative energy content of the sub-bands;
   characterized in said bit allocation means being operative to vary the number of bits used for encoding in accordance with a fixed predetermined set of n numbers, said bit allocation means including means for measuring the energy content of each sub-band, and for ranking the sub-bands in the order of their energy content, said bit allocation means further including means for allocating to the sub-band having the largest energy content the number of bits indicated by the largest number of the set and for allocating to each successively lower energy sub-band the highest remaining number from the set.

2. A sub-band coder according to claim 1 characterized in that it includes normalization means for applying a separate scaling factor to each of the respective series and the bit allocation means is arranged to effect bit allocation as a function of the scaling factors, whereby transmission of separate bit allocation information to a decoder is unnecessary.

3. A method of sub-band coding a signal, said method comprising the steps of:
   dividing an input signal into a plurality n of sub-band signals, each sub-band representing a respective portion of the frequency spectrum of the input signal,
   determining the relative energy content of each of the sub-band signals, and digitally encoding each sub-band signal using a number of bits, and
   variably allocating the number of bits used to encode each sub-band signal in dependence upon the relative energy content of the sub-bands by allocating larger numbers of bits to sub-bands having larger relative energies, wherein the step of variably allocating the number of bits comprises selecting, for each sub-band signal, as the number of allocated bits one of a fixed predetermined set of n numbers (where n is the number of sub-bands) thus varying which sub-band signals are encoded using each given number of bits, and maintaining constant the number of sub-band signals which are thus encoded using that number of bits.

4. A method of allocating a predetermined integer number Z of available digital speech signal transmission bits to a predetermined integer number P of frequency sub-bands of digital data collectively representing an analog human speech signal, said method comprising the steps of:

providing a fixed integer number Q of digital words in a progressive sequence, each of said digital words having respective fixed number of bits, which collectively total Z bits, said sequence including at least one word $Q_j$ having j bits, and at least one word $Q_{j-1}$ having j−1 bits where j is an integer less than Z;

determining the relative energy content of each of the P sub-bands;

ranking the P sub-bands into a progressive sequence of most-to-least energy content; and successively allocating the sub-band with highest energy content to the digital word in said sequence having the highest available number of bits such that sub-band/word assignments are made in the order of highest energy sub-bands to longest bit length words, respectively.

5. A method as in claim 4 further comprising the step of normalizing the sub-band of digital data by applying respective scaling factors thereto and wherein said allocating step is performed as a function of the scaling factors whereby transmission of separate bit allocation information, for use in decoding of same, is unnecessary.

6. A method of allocating a predetermined integer number Z of available digital signal transmission bits to a predetermined integer number P of digitized transform coefficient sequences which are obtained by transforming an input speech signal into a plurality of digitized transform coefficients, the digitized transform coefficients of a predetermined order providing one of said sequences, said method comprising the steps of:

providing a fixed integer number Q of digital words in a progressive sequence, each of said digital words having respective fixed number of bits, which collectively total Z bits, said sequence including at least one word $Q_j$ having j bits, and at least one word $Q_{j-1}$ having j−1 bits where j is an integer less than Z;

determining the relative energy content of each of the P sequences;

ranking the P sequences into a progressive sequence of most-to-least energy content; and successively allocating the sequence with highest energy content to the digital word in said sequence having the highest available number of bits such that sequence/word assignments are made in the order of highest energy sequences to longest bit length words, respectively.

7. A method as in claim 6 further comprising the step of normalizing the digitized transform coefficients by applying respective scaling factors thereto and wherein said allocating step is performed as a function of the scaling factors whereby transmission of separate bit allocation information, for use in decoding of same, is unnecessary.

8. Apparatus for allocating a predetermined integer number Z of available digital speech signal transmission bits to a predetermined integer number P of frequency sub-bands of digital data collectively representing an analog human speech signal, said apparatus comprising:

means for providing a fixed integrer number Q of digital words in a progressive sequence, each of said digital words having respective fixed numbers of bits, which collectively total Z bits, said sequence including at least one word $Q_j$ having j bits, and at least one word $Q_{j-1}$ having j−1 bits where j is an integer less than Z;

means for determining the relative energy content of each of the P sub-bands;

means for ranking the P sub-bands into a progressive sequence of most-to-least energy content; and means for successively allocating the sub-band with highest energy content to the digital word in said sequence having the highest available number of bits such that sub-band/word assignments are made in order of highest energy sub-bands to longest bit length words, respectively.

9. Apparatus as in claim 8 further comprising means for normalizing the digital data by applying respective scaling factors thereto and wherein said means for allocating performs the allocation as a function of the scaling factors whereby transmission of separate bit allocation information, for use in decoding of same, is unnecessary.

10. Apparatus for allocating a predetermined integer number Z of available digital signal transmission bits to a predetermined integer number P of digitized transform coefficient sequences including means for transforming an input speech signal into a plurality of digitized transform coefficients, the digitized transform coefficients of a predetermined order thus providing one of said sequences, said apparatus further comprising:

means for providing a fixed integer number Q of digital words in a progressive sequence, each of said digital words having respective fixed number of bits, which collectively total Z bits, said sequence including at least one word $Q_j$ having j bits, and at least one word $Q_{j-1}$ having j−1 bits where j is an integer less than Z;

determining the relative energy content of each of the P sequences;

ranking the P sequences into a progressive sequence of most-to-least energy content; and successively allocating the sequence with highest energy content to the digital word in said sequence having the highest available number of bits such that sequence/word assignements are made in the order of highest energy sequences to longest bit length words, respectively.

11. Apparatus as in claim 10 further ocmprising means for normalizing the digital data by applying respective scaling factors thereto and wherein said means for allocating performs the allocaiton as a function of the scaling factors whereby transmission of separate bit allocation information, for use in decoding the same, is unnecessary.

12. A method for efficiently and successively allocating a fixed number of digital signal transmission bits arranged in a predetermined number of fixed bit length groups to a predetermined number of digital data sequences collectively representing an analog audio signal, said sequences being obtained by sub-band filtering and quantized digitization or by digital transform coding of digitized signals, said method comprising the steps of:

determining the relative energy contents of said digital data sequences;

allocating a first of said fixed bit length groups, having the highest number of bits, to the digital data sequence having the highest determined energy content;

allocating a second of said fixed bit length groups, having the remaining highest number of bits for those groups not allocated in step (ii), to the digital data sequence having the second highest determined energy content; and continuing to successively allocate a further fixed bit length group, having the remaining highest number of bits for those words not alrady allocated in earlier steps, to the digital data sequence having the next highest detemined energy content until all available groups have been thus allocated.

13. Apparatus for efficiently and successively allocating a fixed number of digital signal transmission bits arranged in a predetermined number of fixed bit length groups to a predetermined number of digital data sequences collectively representing an analog audio signal, said sequences being obtained by sub-band filtering and quantized digitization or by digital transform coding of digitized signals, said apparatus comprising:

means for determining the relative energy contents of said digital data sequences;

means operatively coupled to said determining means for allocating a first of said fixed bit length groups, having the highest number of bits, to the digital data sequence having the highest determined energy content;

means operatively coupled to said determining means for allocating a second of said fixed bit length groups, having the remaining highest number of bits for those groups not allocated by said means for allocating a first of said groups, to the digital data sequence having the second highest detemined energy content; and means operatively coupled to said determining means for continuing to successively allocate a further fixed bit length group, having the remaining highest number of bits for those words not already allocated by said means for allocating a first of said groups and said means for allocating a second of said groups, to the digital data sequence having the next highest determined energy content until all available groups have been thus allocated.

14. A method of sub-band coding an input signal comprising the steps of:

filtering the signal into a plurality n of sub-band signals, such sub-band representing a respective portion of the frequency spectrum of the input signal, determining the relative energy content of each said sub-band signal, and digitally encoding each said sub-band signal, using a number of bits allocated to each said sub-band in dependence upon its detemined relative energy content, wherein said encoding step includes allocating said number of bits to each sub-band by the following steps:

ranking the sub-bands in order of their energy content, and selecting for each sub-band a number of bits from a fixed predetermined set of n numbers, the said selecting step allocating the largest number of bits within the set to the sub-band signal determined as having the largest energy content, and allocating to each successively lower energy sub-band signal the highest remaining number in the set.

* * * * *